(12) United States Patent
Sakurai (10) Patent No.: US 9,703,181 B2
(45) Date of Patent: Jul. 11, 2017

(54) PROJECTOR

(71) Applicant: SEIKO EPSON CORPORATION, Tokyo (JP)

(72) Inventor: Takayuki Sakurai, Azumino (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/994,589

(22) Filed: Jan. 13, 2016

(65) Prior Publication Data

US 2016/0209736 A1    Jul. 21, 2016

(30) Foreign Application Priority Data

Jan. 21, 2015    (JP) ................. 2015-009618

(51) Int. Cl.
    *G03B 21/14*    (2006.01)
    *H04N 9/31*     (2006.01)
    *G03B 21/54*    (2006.01)

(52) U.S. Cl.
    CPC .......... *G03B 21/145* (2013.01); *G03B 21/54* (2013.01); *H04N 9/3141* (2013.01)

(58) Field of Classification Search
    CPC ...... G03B 21/145; G03B 21/14; G03B 21/54; H04N 9/3141; H04N 9/31
    USPC .......................................... 353/119
    See application file for complete search history.

(56) References Cited

U.S. PATENT DOCUMENTS 6,302,543 B1 *   10/2001   Arai .............. G03B 21/145
                                                    248/157
2015/0268540 A1 *  9/2015   Nagatani ........ G03B 21/145
                                                    353/119

FOREIGN PATENT DOCUMENTS

JP    2008-176097 A    7/2008
JP    2010-175930 A    8/2010

* cited by examiner

*Primary Examiner* — William C Dowling
*Assistant Examiner* — Ryan Howard
(74) *Attorney, Agent, or Firm* — Oliff PLC (57) ABSTRACT

A projector includes: an optical unit as an image projection device which forms and projects an image; a support member which supports the optical unit; an exterior casing which forms an exterior and houses the optical unit and the support member; and at least one of a foot portion and a handle which is provided on the support member and exposed outside the exterior casing and supports the support member.

2 Claims, 4 Drawing Sheets

PROJECTOR

BACKGROUND

1. Technical Field

The present invention relates to a projector.

2. Related Art

According to the related art, a projector which modulates light emitted from a light source, thus forms an image corresponding image information and projects the image on a projection target surface such as a screen is known. As such a projector, a projector having a configuration in which the configuration for forming the image is arranged on a metallic base is known (see, for example, JP-A-2008-176097).

The projector disclosed in JP-A-2008-176097 includes: a lamp unit; a light guiding unit; a main body unit; a prism unit; an optical unit having a projection lens unit and a lens mount; a base which serves as a foundation on which the optical unit is installed; and a case to which the base is fixed.

Of these components, the lamp unit has a lamp as a light source and a reflector. The light guiding unit equalizes illumination light which becomes incident from the lamp unit. The main body unit converts the illumination light which becomes incident from the light guiding unit, to S-polarized light, and separates the light into light beams of the three colors of red, green and blue with a plurality of dichroic mirrors. The prism unit has a liquid crystal panel which provides image information to the illumination light separated into the three colors, and a plurality of prisms which emit the light beams of the three colors, as a single beam of image light. The lamp unit, the light guiding unit, the main body unit and the prism unit are attached to the base with screws.

The projection lens unit is for projecting image light in an enlarged manner and is attached to the base via the lens mount.

Since the base to which the optical unit is attached is a metallic base, the occurrence of strain is restrained and deterioration in the optical capability of the optical unit is restrained.

However, in the projector disclosed in JP-A-2008-176097, the case, which forms the exterior, supports the optical unit and the base. Therefore, there is a risk that the case may bend because of the weight of the base with the weight of the optical unit added, and the case needs to have a rigidity that can restrain the occurrence of the bending. If the thickness of the case is increased in order to secure such a rigidity, the weight of the case increases, raising the problem of increase in the weight of the projector.

Particularly in the case where a foot portion to contact a placing surface is provided on the bottom surface of the case, or where a handle (arm) to be grasped when the projector is carried or installed on the ceiling is provided on the top surface of the case, a stress concentrates at the foot portion of the case or the position of installation of the handle at the time of installing the projector. Therefore, a higher rigidity of the case needs to be secured in order to secure the strength of the position of installation, thus raising the problem that the weight of the projector tends to increase.

SUMMARY

An advantage of some aspects of the invention is to provide a projector that can be reduced in weight.

A projector according to an aspect of the invention includes: an image projection device which forms and projects an image; a support member which supports the image projection device; an exterior casing which forms an exterior and houses the image projection device and the support member; and at least one of a foot portion and a handle which is provided on the support member and exposed outside the exterior casing and supports the support member.

According to the aspect of the invention, since the exterior casing does not support the image projection device or the support member, the weight of the image projection device and the support member is not applied on the exterior casing but is applied on one of the foot portion and the handle provided on the support member. Thus, there is no need to increase the rigidity of the exterior casing in order to improve the load bearing capacity of the exterior casing, and increase in the weight of the exterior casing corresponding to increase in the rigidity can be restrained. Therefore, lighter weight of the exterior casing and hence lighter weight of the projector can be achieved.

In the aspect of the invention, it is preferable that the exterior casing has a bottom surface portion which faces a placing surface when the projector is placed on the placing surface, and a top surface portion situated on the side opposite to the bottom surface portion, and that the support member has a first support member and a second support member, each of which is in the form of a plate having a surface along a first direction heading toward the top surface portion from the bottom surface portion and a direction of projection of an image in the image projection device, and which are arranged next to each other in a second direction orthogonal to the first direction and orthogonal to the direction of projection and sandwich the image projection device.

Here, in the case where the support member is formed in a flat plate-like shape and arranged at a position on the side of the top surface portion of the exterior casing, like the base described in JP-A-2008-176097, the dimension between the placing surface and the support member is large and therefore it is difficult to provide the foot portion exposed outside the exterior casing, on the support member. Meanwhile, in the case where the support member formed in a flat plate-like shape is arranged at a position on the side of the bottom surface portion of the exterior casing, if a handle is provided exposed on the side of the top surface portion, the dimension between the position of exposure of the handle and the support member is large and therefore it is difficult to provide the handle on the support member.

In contrast, according to the configuration of the above aspect, the first support member and the second support member sandwiching the image projection device in the second direction have the shape of a plate having a surface along the first direction and the direction of projection. Thus, the foot portion to contact the placing surface where the projector is placed can be easily arranged at a site near the bottom surface portion, on the first support member and the second support member. Also, a member for lifting the projector or the handle to be grasped by the user can be easily arranged at a site near the top surface portion, on the first support member and the second support member. Moreover, since the dimensions of the foot portion and the handle inside the exterior casing can be reduced, the occurrence of deformation can be restrained, compared with the case where these parts are longer.

In the aspect of the invention, it is preferable that the exterior casing has a bottom surface portion-side casing located on the side of the bottom surface portion, and a top surface portion-side casing located on the side of the top surface portion, that the bottom surface portion-side casing is fixed at a site on the side of the bottom surface portion, on the first support member and the second support member, and that the top surface portion-side casing is fixed at a site on the side of the top surface portion, on the first support member and the second support member.

According to the aspect of the invention with this configuration, the bottom surface portion-side casing and the top surface portion-side casing, which form the exterior casing, are each fixed to the first support member and the second support member. Thus, the application of the weight of the first support member and the second support member on the bottom surface portion-side casing and the top surface portion-side casing can be securely restrained. Therefore, lighter weight of the bottom surface portion-side casing and the top surface portion-side casing and hence lighter weight of the projector can be facilitated.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
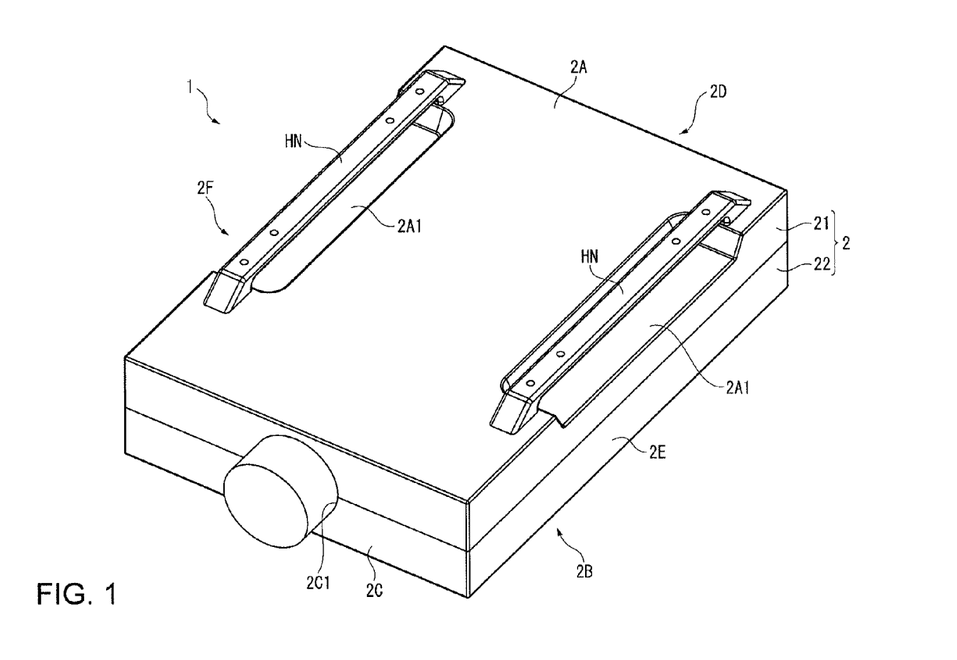
FIG. 1 is a perspective view showing the appearance of a projector according to a first embodiment of the invention.

Hereinafter, a first embodiment of the invention will be described with reference to the drawings.
Schematic Configuration of Projector FIG. 1 is a perspective view showing the appearance of a projector 1 according to this embodiment.

The projector 1 according to the embodiment is an image display device which modulates light emitted from a light source 31 provided inside the device, thus forms an image corresponding to image information, and projects the image in an enlarged manner on a projection target surface (not shown) such as a screen. As shown in FIG. 1, the projector 1 has an exterior casing 2 which is substantially rectangular as viewed in a plan view and which forms the exterior of the projector 1 and houses a device main body, described later.
Configuration of Exterior Casing The exterior casing 2 is a casing made of a metal or synthetic resin. The exterior casing 2 is formed by an upper casing 21 as a top surface portion-side casing which constitutes a top surface portion 2A and a part on the side of the top surface portion 2A, of each of a front surface portion 2C, aback surface portion 2D and left and right lateral surface portions 2F, 2E, combined with a lower casing 22 as a bottom surface portion-side casing which constitutes a bottom surface portion 2B opposite the top surface portion 2A and a part on the side of the bottom surface portion 2B, of each of the front surface portion 2C, the back surface portion 2D and the left and right lateral surface portions 2F, 2E.

On the front surface portion 2C, of these portions, apart of a projection device 35 of an optical unit 3, described later, is exposed, and an opening 2C1 through which an image projected from the projection device 35 passes is formed.

The top surface portion 2A is a surface which faces a ceiling, in a suspended position where the projector 1 is suspended by an attachment member (not shown) such as an arm attached to the ceiling or wall surface. On the side of the top surface portion 2A, a support member 4, described later, is attached and the attachment member is attached. Also, a pair of handles HN to be grasped by the user is exposed there.

Also, recess portions 2A1 which are formed at positions corresponding to the respective handles HN and enable easy holding of the respective handles HN with hands or the like are formed in the top surface portion 2A.

The bottom surface portion 2B is a surface which faces a placing surface of an installation table or the like, in a normal placement position where the projector 1 is placed on the placing surface. On the side of the bottom surface portion 2B, the support member 4, described later, is attached and foot portions FT (see FIG. 3) which are brought in contact with the placing surface are exposed.
Configuration of Device Main Body FIGS. 2 and 3 are schematic views showing the internal configuration of the projector 1, as viewed from the side of the top surface portion and the side of the lateral surface portion, respectively.

Figure 2:
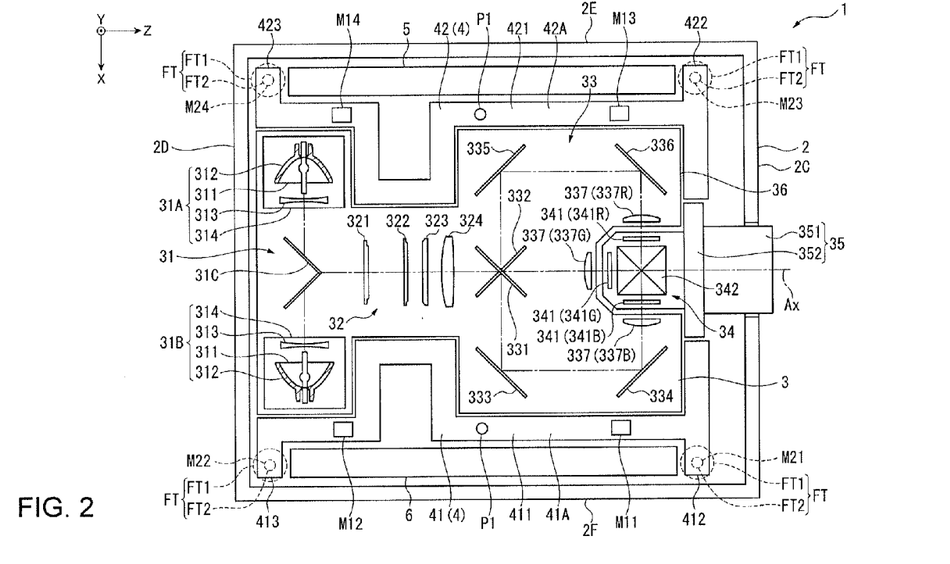
FIG. 2 is a schematic view showing the inside of the projector according to the first embodiment, as viewed from the side of the top surface.
Figure 3:
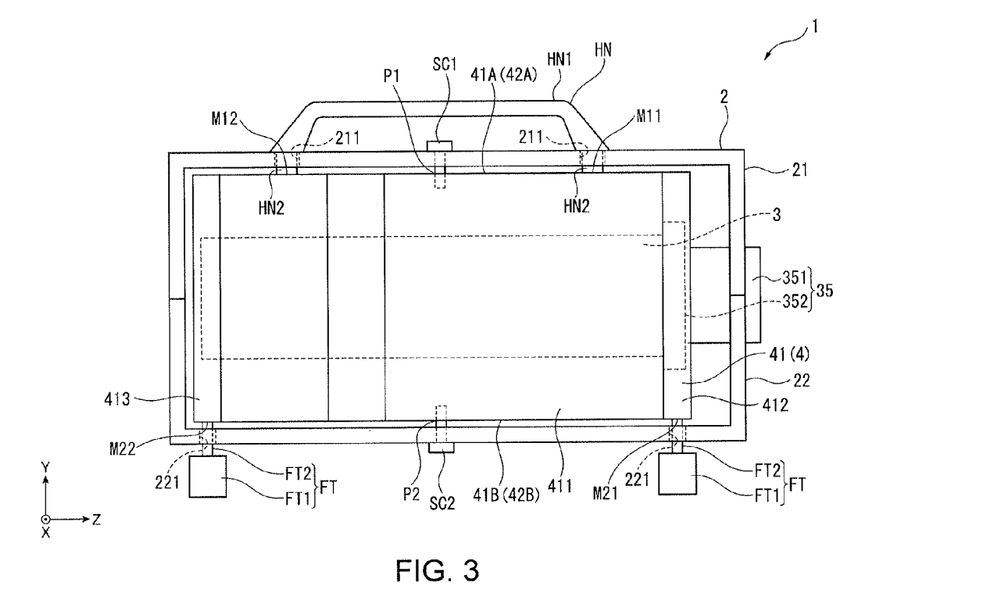
FIG. 3 is a schematic view showing the inside of the projector according to the first embodiment, as viewed from the lateral side.

The device main body has the optical unit 3, the support member 4, a control device (not shown), a power supply device 5, and a cooling device 6, as shown in FIGS. 2 and 3.

Of these components, the control device includes a substrate on which a control circuit or the like for controlling the projector 1 is mounted. The power supply device 5, though not shown in detail, converts an alternating current inputted from the grid to a direct current, then transforms the voltage thereof, and supplies the resulting current to electronic components of the projector 1. The cooling device 6 has a fan or the like which blows the air introduced from outside the exterior casing 2, and thus cools a cooling target forming the projector 1.

In the description below, the direction of projection of an image by the optical unit 3 (projection device 35) is referred to as a Z-direction, and directions orthogonal to the Z-direction and orthogonal to each other are referred to as an X-direction and Y-direction. In this embodiment, the Y-direction is defined as the direction heading toward the top surface portion 2A from the bottom surface portion 2B, and the X-direction is defined as the direction heading toward the left lateral surface portion 2F from the right lateral surface portion 2E.
Configuration of Optical Unit The optical unit 3 is equivalent to the image projection device according to the invention and forms and projects an image corresponding to image information under the control of the control device (not shown).

The optical unit 3 has the light source 31, an illumination device 32, a color separation device 33, an electro-optical device 34, the projection device 35, and an optical component casing 36, the as shown in FIG. 2.

Of these components, the optical component casing 36 is a casing housing the light source 31 and the respective optical devices 32 to 34 inside.

The light source 31 emits light to the illumination device 32. The light source 31 has a pair of light source portions 31A, 31B facing each other, and a reflection mirror 31C which guides the light emitting from each of the pair of light source portions 31A, 31B, to the illumination device 32.

Each light source portion, of the pair of light source portions 31A, 31B, has a light source lamp 311 such as an ultra-high-pressure mercury lamp, a reflector 312 and a parallelizing lens 313, and a housing 314 housing these components inside. However, this configuration is not limiting. A solid light source such as an LED (light emitting diode) or LD (laser diode) may be employed instead of the light source lamp.

The reflection mirror 31C is arranged between the pair of light source portions 31A, 31B and reflects the light incident from each light source portion into the same direction. Thus, the light emitted from the respective light source portions 31A, 31B becomes incident on the illumination device 32.

The illumination device 32 equalizes the illuminance within a plane orthogonal to the center axis of the luminous flux reflected and made incident by the reflection mirror 31C. The illumination device 32 has lens arrays 321, 322, a polarization conversion element 323, and a superimposing lens 324.

The color separation device 33 separates the luminous flux incident from the illumination device 32 into three color light beams of red, green, and blue. The color separation device 33 has dichroic mirrors 331, 332, reflection mirrors 333 to 336, and condensing lenses 337 (337R, 337G, 337B).

The dichroic mirrors 331, 332 are each tilted substantially at the angle of 45 degrees to center axis of the incident luminous flux and arranged orthogonally to each other. Of these, the dichroic mirror 331 reflects the blue light and transmits the light of the other colors. The dichroic mirror 332 reflects the red light and transmits the light of the other colors. With such dichroic mirrors 331, 332, the blue light and the red light are reflected in the opposite directions to each other and bent by 90 degrees, whereas the green light is transmitted through these mirrors 331, 332.

The reflection mirrors 333, 334 are arranged on the optical path of the blue light and guide the blue light to a light modulation device 341 (341B) for blue light in the electro-optical device 34, described later. The reflection mirrors 335, 336 are arranged on the optical path of the red light and guide the red light to a light modulation device 341 (341R) for red light in the electro-optical device 34.

The condensing lenses 337 are arranged on the optical paths of the separated light of the respective colors. The condensing lenses 337 parallelize the light of the respective colors and cause the light to become incident on the respective light modulation devices 341.

The electro-optical device 34 modulates the separated light of the respective colors, combines the modulated light of the respective colors, and forms image light. The electro-optical device 34 has three light modulation devices 341 (light modulation devices for red, green and blue 341R, 341G, 341B), and one color combining device 342.

Each light modulation devices 341 modulates the incident light (color light) and form an image corresponding to image information inputted from the control device. The light modulation device 341 has a liquid crystal panel and a pair of polarizers arranged on the light incident side and the light exiting side of the liquid crystal panel, though not illustrated in the embodiment.

The color combining device 342 has three light incident surfaces facing the respective light modulation devices 341, and one exiting surface which combines and emits the color light incident via the light incident surfaces. The color combining device 342 thus emits the combined color light to the projection device 35. In the embodiment, a cross dichroic prism is employed as the color combining device 342.

The projection device 35 projects the image combined by the color combining device 342 onto the projection target surface. The projection device 35 has a plurality of lenses including a focusing lens and a zoom lens (not shown), a lens barrel 351 housing the plurality of lenses inside, and a flange portion 352 supporting the lens barrel 351.

In the optical unit 3 configured as described above, the luminous fluxes emitted from the pair of light source portions 31A, 31B are reflected along an illumination optical axis Ax (see FIG. 1) set inside the optical component casing 36, by the reflection mirror 31C, and are thus cast on the illumination device 32. The luminous fluxes cast on the illumination device 32 are equalized in in-plane illuminance by the illumination device 32 and separated into color light of the three colors R, G, B by the color separation device 33. The separated color light is each modulated by each light modulation device 341 according to image information, thus forming an image of each color light. The images of the color light of the respective colors are combined by the color combining device 342 and projected on the screen (not shown) by the projection device 35.

Configuration of Support Member

The support member 4 supports the optical unit 3 and also supports the exterior casing 2 on the inner side of the exterior casing 2. The support member 4 thus supports the entirety of the projector 1.

The support member 4 has a first support member 41 and a second support member 42 as a pair of support members. The first support member 41 and the second support member 42 sandwich the optical unit 3 along the X-direction (second direction) of the optical unit 3. Specifically, the first support member 41 is located on the X-direction side of the optical unit 3, whereas the second support member 42 is located on the side opposite to the X-direction.

Configuration of First Support Member

The first support member 41 has a main body portion 411, a first extending portion 412, and a second extending portion 413, as shown in FIG. 2.

The main body portion 411 is a plate-like member which has an outer shape along the surface on the X-direction side and a part of the surface on the Z-direction side (that is, an area located on the X-direction side from the flange portion 352), of the optical component casing 36 of the optical unit 3, and which has a surface along the Y-direction (first direction) and the Z-direction (direction of projection). On the main body portion 411, the optical component casing 36 and the flange portion 352 are attached with screws or the like, though not illustrated.

The plate-like shape mentioned here means, for example, that the main body portion 411 has a shape with a thickness such that a rigidity that can support the exterior casing 2 and the optical unit 3 is achieved.

The first extending portion 412 extends in the X-direction from the end on the Z-direction side, of the main body portion 411. The end surface on the X-direction side of the first extending portion 412 is located near the left lateral surface portion 2F of the exterior casing 2.

The second extending portion 413 extends in the X-direction from the end on the side opposite to the Z-direction, of the main body portion 411. The end surface on the X-direction side of the second extending portion 413 is located near the left lateral surface portion 2F of the exterior casing 2.

On a surface 41A (top surface 41A) on the Y-direction side, of the first support member 41, a fixture portion P1 to which the upper casing 21 is fixed with a screw SC1, and attachment portions M11, M12 to which to which the handle HN is attached, are provided (see FIGS. 2 and 3).

On a surface 41B (bottom surface 41B) on the side opposite to the Y-direction, of the first support member 41, a fixture portion P2 to which the lower casing 22 is fixed with a screw SC2, and attachment portions M21, M22 to which the foot portion FT is attached, are provided (see FIGS. 2 and 3). The attachment portion M21 is provided at the position corresponding to the end on the X-direction side of the first extending portion 412, on the top surface 41A. The attachment portion M22 is provided at the position corresponding to the end on the X-direction side of the second extending portion 413, on the top surface 41A.

The first support member 41 as described above has a rigidity that can restrain bending due to the weight of the exterior casing 2 and the optical unit 3.

Configuration of Second Support Member

The second support member 42 is configured substantially with mirror symmetry with the first support member 41, as shown in FIG. 2, and has a main body portion 421, a first extending portion 422, and a second extending portion 423, similarly to the first support member 41.

The main body portion 421 has an outer shape along the surface on the side opposite to the X-direction and a part of the surface on the Z-direction side (that is, an area located on the side opposite to the X-direction from the flange portion 352), of the optical component casing 36, and has a surface along the Y-direction and the Z-direction. On the main body portion 421, the optical component casing 36 and the flange portion 352 are attached.

The he first extending portion 422 and the second extending portion 423 extend in the direction opposite to the X-direction from the end on the Z-direction side and the end on the side opposite to the Z-direction, respectively, of the main body portion 421.

On a surface 42A (top surface 42A) on the Y-direction side, of the second support member 42, a fixture portion P1 to which the upper casing 21 is fixed with a screw SC1, and attachment portions M13, M14 to which to which the handle HN is attached, are provided (see FIG. 2).

On a surface 42B (bottom surface 42B) on the side opposite to the Y-direction, of the second support member 42, a fixture portion P2 to which the lower casing 22 is fixed with a screw SC2, and attachment portions M23, M24 to which the foot portion FT is attached, are provided (see FIG. 2). The attachment portion M23 is provided at the position corresponding to the end on the side opposite to the X-direction of the first extending portion 422, on the top surface 42A. The attachment portion M24 is provided at the position corresponding to the end on the side opposite to the X-direction of the second extending portion 423, on the top surface 42A.

The second support member 42 as described above has a rigidity that can restrain bending due to the weight of the exterior casing 2 and the optical unit 3, similarly to the first support member 41.

Configuration of Foot Portion

The foot portion FT is a member which, in the normal placement position, directly contacts the placing surface and thereby supports the projector 1, as described above.

The foot portion FT has a foot portion main body FT1 which is exposed outside the exterior casing 2 and contacts the placing surface, and a connecting portion FT2 which extends from the foot portion main body FT1 and is connected to the support member 4 (first support member 41 and second support member 42), as shown in FIG. 3. In the embodiment, the foot portion FT is attached to the ends on the side of the X-direction at the positions corresponding to the first extending portion 412 and the second extending portion 413 on the bottom surface 41B and the ends on the side opposite to the X-direction at the positions corresponding to the first extending portion 422 and the second extending portion 423 on the bottom surface 42B, as shown in FIG. 2.

The connecting portion FT2 is inserted in a through-hole 221 formed in the lower casing 22, and the end on the side of the Y-direction of the connecting portion FT2 is attached to the attachment portions M21, M22 of the first support member 41 and the attachment portions M23, M24 of the second support member 42 located inside the exterior casing 2, as shown in FIG. 3.

Thus, a plurality of foot portions FT are attached to the first support member 41 and the second support member 42, and the foot portion main bodies FT1 are exposed outside the exterior casing 2 in such a way that the foot portion main bodies FT1 can contact the placing surface.

In the embodiment, four foot portions FT are arranged near the corners of the bottom surface portion 2B of the projector 1, as viewed in a plan view from the side opposite to the Y-direction. As viewed in this plan view, the foot portions FT are provided at the positions equivalent to the corners of a rectangular area surrounding the optical unit 3.

Configuration of Handle

As described above, the handle HN is a member which supports the projector 1 when the projector 1 is lifted as in the case where the projector 1 is installed by being suspended from the ceiling, or the like.

The handle HN has a handle main body HN1, and a connecting portion HN2 which extends from the handle main body HN1 and is connected to the support member 4, as shown in FIGS. 1 and 3. In the embodiment, one of the two handles HN is attached to the top surface 41A of the first support member 41 and the other is attached to the top surface 42A of the second support member 42.

The handle main body HN1 is a member to be held by an equipment unit for ceiling suspension (the above attachment member) or by the user, and is exposed outside the exterior casing 2, as shown in FIG. 1.

The connecting portion HN2 connects the handle main body HN1 to the first support member 41 and the second support member 42. The handle main body HN1 is inserted in a through-hole 211 formed in the upper casing 21, as shown in FIG. 3. The connecting portion HN2 of one handle HN is connected to the attachment portions M11, M12 on the top surface 41A of the first support member 41 located inside the exterior casing 2. Similarly, the connecting portion HN2 of the other handle HN is connected to the attachment portions M13, M14 on the top surface 42A of the second support member 42 located inside the exterior casing 2.

Thus, the respective handles HN are attached to the respective support members 41, 42, in the state of being exposed to the side of the top surface portion 2A, and thus fixed to the respective support members 41, 42.

Advantageous Effects of First Embodiment

The projector 1 according to the embodiment described above has the following advantageous effects.

The projector 1 has the first support member 41 and the second support member 42 as the support members 4 supporting the optical unit 3, and the exterior casing 2 is attached to the first support member 41 and the second support member 42. The foot portions FT and the handles HN are also attached to the first support member 41 and the second support member 42.

With such a configuration, since the exterior casing 2 does not support the optical unit 3, the first support member 41 and the second support member 42, the weight of the optical unit 3, the first support member 41 and the second support member 42 is not applied on the exterior casing 2 but is applied on either the foot portions FT or the handles HN. Thus, there is no need to increase the rigidity of the exterior casing 2 in order to restrain the occurrence of bending of the exterior casing 2 due to the weight of the optical unit 3, and increase in the weight of the exterior casing 2 corresponding to increase in the rigidity can be restrained. Therefore, lighter weight of the exterior casing 2 and hence lighter weight of the projector 1 can be achieved.

Here, for example, if the support members are formed in the form of flat plates and arranged at positions on the side of the top surface portion 2A of the exterior casing 2, the dimension between the placing surface where the projector 1 is placed and the support members is large and therefore it is difficult to provide the foot portions FT exposed outside the exterior casing 2, on the support members. Meanwhile, if the support members formed in the shape of flat plates are arranged at positions on the side of the bottom surface portion 2B of the exterior casing 2 and the handles HN are provided exposed on the side of the top surface portion 2A, the dimension between the positions of exposure of the handles HN and the support members is large and therefore it is difficult to provide the handles on the support members.

In contrast, according to the embodiment, the first support member 41 and the second support member 42 are each arranged along the Y-direct ion and the Z-direction and sandwich the optical unit 3 along the X-direction. Thus, the foot portions FT can be easily arranged at sites near the bottom surface portion 2B, on the first support member 41 and the second support member 42. Also, the handles HN can be easily arranged at sites near the top surface portion 2A, on the first support member 41 and the second support member 42. Moreover, since the dimensions of the foot portions FT and the handles HN inside the exterior casing 2 can be made shorter, the occurrence of deformation of the foot portions FT and the handles HN can be restrained, compared with the case where these dimensions are longer.

The foot portions FT are provided on the surface on the side of the bottom surface portion 2B, of the first support member 41 and the second support member 42 arranged to sandwich the optical unit 3 from both side in the X-direction.

With such a configuration, the foot portions FT can be attached to the attachment portions M21, M22, M23, M24 provided at positions surrounding the optical unit 3, for example, the positions corresponding to the corners of a rectangular area surrounding the optical unit 3, as viewed in a plan view from the side opposite to the Y-direction. Thus, the projector 1 can be stably supported by the foot portions FT arranged to surround the optical unit 3, as viewed in this plan view. Similarly, the handles HN can be attached to the attachment portions M11, M12, M13, M14 provided to surround the optical unit 3 and can stably support the projector 1.

Also, the foot portions FT are provided at the distal ends in the direction of extension, of the first extending portion 412 of the first support member 41 and the first extending portion 422 of the second support member 42 extending in the opposite directions to each other. Similarly, the foot portions FT are provided at the distal ends in the direction of extension, of the second extending portion 413 of the first support member 41 and the second extending portion 423 of the second support member 42.

With such a configuration, the positions of attachment of the foot portions FT as viewed in a plan view from the Y-direction can be adjusted according to the dimensions in the direction of extension (X-direction), of the respective first extending portions 412, 422 and the respective second extending portions 413, 423.

For example, the distance between the two foot portions FT provided on the first extending portion 412 of the first support member 41 and the first extending portion 422 of the second support member 42 can be increased. Similarly, the distance between the two foot portions FT provided on the respective second extending portions 413, 423 can be increased. Thus, in the normal placement position, the projector 1 can be stably placed on the installation surface.

The upper casing 21 and the lower casing 22 forming the exterior casing 2 are reach fixed to the first support member 41 and the second support member 42. Thus, the application of the weight of the first support member 41 and the second support member 42 on each of the upper casing 21 and the lower casing 22 can be securely restrained. Therefore, lighter weight of the upper casing 21 and the lower casing 22 and hence lighter weight of the projector 1 can be facilitated.

Also, the rigidity of the lower casing 22 can be reduced, for example, compared with a configuration in which the lower casing 22 is fixed to the respective support members 41, 42 and in which the upper casing 21 is fixed to the lower casing 22 and supported by the lower casing 22. Therefore, lighter weight of the exterior casing 2 and hence lighter weight of the projector 1 can be facilitated.

Second Embodiment

Hereinafter, a second embodiment of the invention will be described.

The projector according to this embodiment has a configuration similar to that of the projector 1 but is different from the projector 1 in that the optical unit 3 is supported by a single support member arranged on the side of the bottom surface portion 2B of the exterior casing 2. In the description below, the same or substantially same parts as those described already will not be described further.

Figure 4:
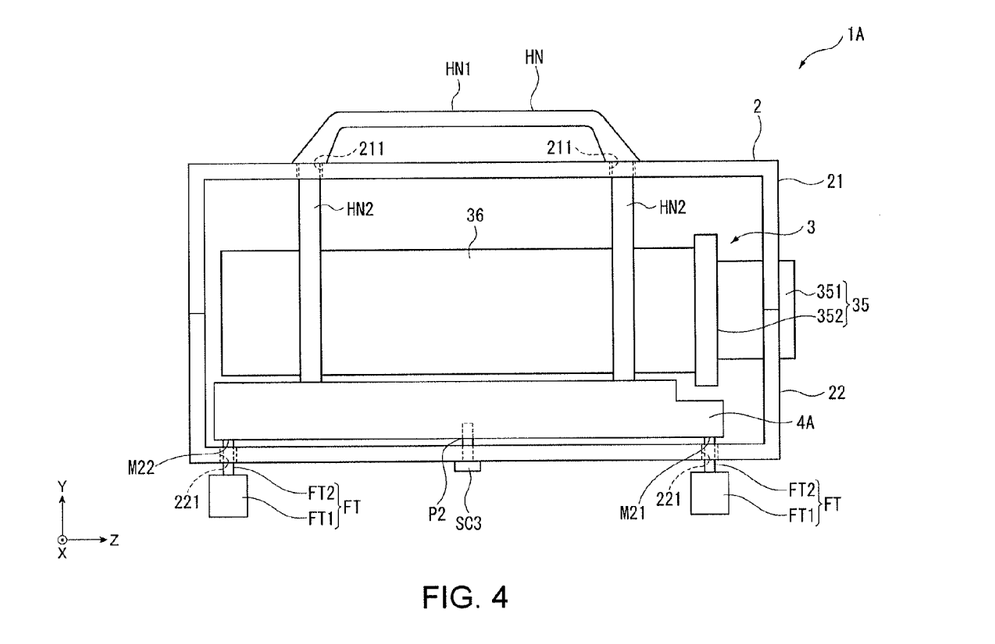
FIG. 4 is a schematic view showing the internal configuration of a projector according to a second embodiment of the invention.

FIG. 4 is a cross-sectional view schematically showing the internal configuration of a projector 1A according to this embodiment.

The projector 1A according to the embodiment has configurations and functions similar to those of the projector 1, except for having a support member 4A instead of the support member 4, as shown in FIG. 4.

The support member 4A is formed in the shape of a plate and arranged on the side opposite to the Y-direction of the optical unit 3. The support member 4A supports the optical unit 3. The exterior casing 2 (lower casing 22) is fixed to the support member 4A with a screw SC3. The support member 4A has a rigidity that does not allow the support member to bend because of the weight of the exterior casing 2 and the optical unit 3.

In the embodiment, though not illustrated, the upper casing 21 forming the exterior casing 2 is fixed to the lower casing 22.

The foot portions FT are attached to the surface on the side opposite to the Y-direction of the support member 4A, as in the projector 1.

The handles HN are attached to the surface on the side of the Y-direction of the support member 4A, as in the projector 1. In this embodiment, a beam portion connecting two connecting portions HN2 may be provided along the inner circumferential surface of the exterior casing 2 in order to restrain deformation of the four connecting portion HN2.

Advantageous Effects of Second Embodiment

The projector 1A according to the embodiment described above can achieve lighter weight, as in the case of the projector 1 according to the first embodiment, and also has the following advantageous effects.

The optical unit 3 is supported on the side of the bottom surface portion 2B by the support member 4A. Thus, in the case where the projector is used with the Y-direction aligned with a vertically upward direction, the support member 4A supports the optical component casing 36 from below in the vertical direction and therefore bending of the optical component casing 36 can be restrained.

The optical unit 3 is supported by the single support member 4A. Thus, lighter weight of the support portion and hence lighter weight of the projector 1A can be achieved than in the case where the optical unit 3 is supported by a plurality of support members.

Also, when arranging the optical unit 3 on the support member 4A, it is possible to arrange the optical unit 3 in the direction opposite to the Y-direction from the side of the top surface portion 2A. Therefore, the installation and position adjustment of each optical component (optical components forming the optical unit 3) is easier than in the case where the optical unit is sandwiched between the pair of support members 41, 42.

Modifications of Embodiments

The invention is not limited to the above embodiments and includes modifications, improvements and the like within the range that can achieve the object of the invention.

The optical unit 3 is supported by the two support members 41, 42 in the first embodiment, and by the single support member 4A in the second embodiment. However, the invention is not limited to these configurations. For example, the optical unit 3 may be supported by three or more support members. Also, the support member may be formed in the shape of a box with a substantially U-shaped cross section. For example, a configuration in which the respective support members 41, 42 along the Y-direction in the first embodiment are combined with the support member 4A intersecting with the Y-direction in the second embodiment may be employed. In this case, the respective support members may be formed integrally.

In the first embodiment, the respective support members 41, 42 have the first extending portions 412, 422 and the second extending portions 413, 423, and the foot portions FT are attached on the side of the bottom surface portion 2B of these extending portions 412, 413, 422, 423. However, the invention is not limited to this configuration. For example, the respective support member 41, 42 may not have the respective extending portions 412, 413, 422, 423, and the foot portions FT maybe attached to the main body portions 411, 421.

Also, the respective support members 41, 42 may be in a bent shape having a first portion extending along the Y-direction and second portions bending respectively from both ends in the Y-direction of the first portion. With such a configuration, the foot portions FT and the handles HN are attached to the second portions. In this way, the respective support members 41, 42 may be plate-like members that can bend or curve according to need.

In the first embodiment, the handles HN are provided on the top surface 41A of the first support member 41 and the top surface 42A of the second support member 42, and the foot portions FT are provided on the bottom surface 41B of the first support member 41 and the bottom surface 42B of the second support member 42. Similarly, in the second embodiment, too, the handles HN are provided on the top surface of the support member 4A and the foot portions FT are provided on the bottom surface of the support member 4A. However, the invention is not limited to these configurations. That is, the attachment portions for the foot portions FT and the handles HN can be attached to any positions on the support members 4, 4A. For example, the foot portions FT and the handles HN may be attached on the lateral surfaces intersecting with the X-direction and the Z-direction of the support members 4, 4A.

In the first embodiment, the two support members 41, each have the surface along the Y-direction (first direction) and the direction of projection, which is the Z-direction, and are arranged to sandwich the optical unit 3 along the X-direction (second direction) orthogonal to the direction of projection. However, the invention is not limited to this configuration. For example, the direction of projection may be a direction other than the Z-direction. Specifically, the direction of projection may be set as any direction along the YZ-plane and may coincide with the Y-direction. Also, the direction of projection may be set to intersect with the YZ-plane.

In other words, when the projector 1 is installed in the normal placement position or in the suspended position, the support members 41, 42 may be arranged to sandwich the optical unit 3 from both side in a predetermined direction that is a horizontal direction, regardless of the direction of projection, and along the surface intersecting with the predetermined direction, of the optical unit 3.

In the embodiments, the handles HN are arranged on the side of the top surface portion 2A of the exterior casing 2. However, the invention is not limited to this configuration. For example, a through-hole may be formed in the right lateral surface portion 2E and the left lateral surface portion 2F of the exterior casing 2. The connecting portions HN2 may be inserted into the exterior casing 2 through the through-holes, and the handle main bodies HN1 may be arranged along the sides of the right lateral surface portion 2E and the left lateral surface portion 2F.

In the first embodiment, the two handles HN are provided on each of the first support member 41 and the second support member 42. However, the invention is not limited to this configuration. That is, the handles HN may be attached, extending over the first support member 41 and the second support member 42.

In the above embodiments, both the foot portions FT and the handles HN are provided. However, the invention is not limited to this configuration. For example, a configuration in which only the foot portions FT are provided, or a configuration in which only the handles HN are provided may be employed.

In the above embodiments, the exterior casing 2 includes the two casings, that is, the upper casing 21 and the lower casing 22. However, the invention is not limited to this configuration. That is, the exterior casing may include three or more casing parts. Also, the exterior casing may include two front and rear casing parts.

In the above embodiments, the light source 31 has the light source portions 31A, 31B, and the light source portions 31A, 31B have the light source lamps 311. However, the invention is not limited to this configuration. That is, a configuration having a solid light source such as LED or LD may be used, as described above. Alternatively, a configuration in which light emitted from an LD is made incident on a phosphor so as to utilize the light emitted from the phosphor may be employed.

Moreover, while the light source 31 has the two light source portions 31A, 31B, the invention is not limited to this configuration and the light source may have one light source portion or may have three or more light source portions.

In the above embodiments, the projector 1 has the three liquid crystal panels as the light modulation device 341. However, the invention is not limited to this configuration. That is, the invention can also be applied to a projector which uses two or fewer, or four or more liquid crystal panels.

In the above embodiments, the position of arrangement of each optical component in the optical unit 3 can be changed according to need. For example, a configuration in a substantially L-shape as viewed in a plan view, or a configuration in a substantially U-shape as viewed in a plan view may be employed.

In the above embodiments, the light modulation device 341 having transmission-type liquid crystal panels whose luminous flux incident surface and luminous flux exiting surface are different is employed. However, a light modulation device having reflection-type liquid crystal panels whose light incident surface and light exiting surface are the same may be used.

In the above embodiments, the projector 1 including the light modulation device 341 having liquid crystal panels is described as an example. However, a light modulation device without using liquid crystal, such as a device using a micromirror, for example, a device using a DMD (digital micromirror device) or the like, may be used as long as the light modulation device can modulate incident luminous fluxes according to image information.

CROSS REFERENCE TO RELATED APPLICATIONS

This application claims priority to Japanese Patent Application No. 2015-009618 filed on Jan. 21, 2015, the entire contents of which are incorporated by reference herein.

What is claimed is:

1. A projector comprising:
an image projection device which forms and projects an image;
a support member which supports the image projection device;
an exterior casing which forms an exterior and houses the image projection device and the support member; and
at least one of a foot portion and a handle which is provided on the support member and exposed outside the exterior casing and supports the support member, wherein:
the exterior casing has a bottom surface portion which faces a placing surface when the projector is placed on the placing surface, and a top surface portion situated on the side opposite to the bottom surface portion, and
the support member has a first support member and a second support member, each of which is in the form of a plate having a surface along a first direction heading toward the top surface portion from the bottom surface portion and a direction of projection of an image in the image projection device, and which are arranged next to each other in a second direction orthogonal to the first direction and orthogonal to the direction of projection and sandwich the image projection device.

2. The projector according to claim 1, wherein
the exterior casing has
a bottom surface portion-side casing located on the side of the bottom surface portion, and
a top surface portion-side casing located on the side of the top surface portion,
the bottom surface portion-side casing is fixed at a site on the side of the bottom surface portion, on the first support member and the second support member, and
the top surface portion-side casing is fixed at a site on the side of the top surface portion, on the first support member and the second support member.

* * * * *